United States Patent
Honda (10) Patent No.: US 11,959,247 B2
(45) Date of Patent: Apr. 16, 2024

(54) SHOVEL AND INFORMATION PROCESSING APPARATUS

(71) Applicant: SUMITOMO HEAVY INDUSTRIES, LTD., Tokyo (JP)

(72) Inventor: Keiji Honda, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 491 days.

(21) Appl. No.: 17/212,006

(22) Filed: Mar. 25, 2021

(65) Prior Publication Data
US 2021/0207340 A1 Jul. 8, 2021

Related U.S. Application Data

(63) Continuation of application No. PCT/JP2019/037888, filed on Sep. 26, 2019.

(30) Foreign Application Priority Data

Sep. 27, 2018 (JP) ................................. 2018-181987

(51) Int. Cl.
 *E02F 3/43* (2006.01)
 *E02F 3/32* (2006.01)

(52) U.S. Cl.
 CPC .............. *E02F 3/437* (2013.01); *E02F 3/32* (2013.01)

(58) Field of Classification Search
 CPC .................................................... E02F 3/437
 See application file for complete search history.

(56) References Cited

U.S. PATENT DOCUMENTS 7,441,404 B2 * 10/2008 Devier ................... E02F 3/431
 60/368
9,481,976 B2 * 11/2016 Kami ...................... E02F 3/437
9,495,615 B2 * 11/2016 Kang ......................... G06T 7/97
(Continued)

FOREIGN PATENT DOCUMENTS

EP      0989242      3/2000
EP      2902550      8/2015
(Continued)

OTHER PUBLICATIONS

International Search Report for PCT/JP2019/037888 dated Dec. 24, 2019.

*Primary Examiner* — Michael A Berns
(74) *Attorney, Agent, or Firm* — IPUSA, PLLC (57) ABSTRACT

A shovel includes a lower traveling structure, an upper swing structure swingably mounted on the lower traveling structure, a work attachment attached to the upper swing structure and including a boom, an arm attached to the boom, and an end attachment attached to the arm, a first obtaining device configured to obtain data on the pose state of the work attachment, and a second obtaining device configured to obtain data on the pose state of the lower traveling structure or the upper swing structure. Predetermined control related to the movement of the work attachment is executed based on the data obtained by the first and second obtaining devices. Information on the type of the end attachment is obtained, and a response characteristic of the work attachment or the details of an operation for the work attachment during the predetermined control are corrected based on the obtained information.

17 Claims, 4 Drawing Sheets

(56) References Cited

U.S. PATENT DOCUMENTS

| | | |
|---|---|---|
| 9,689,140 B2 | 6/2017 | Baba et al. |
| 10,011,976 B1* | 7/2018 | Forcash ................... E02F 9/264 |
| 10,138,618 B2* | 11/2018 | Davis ....................... E02F 9/265 |
| 10,676,900 B2 | 6/2020 | Hiekata |
| 2006/0112685 A1 | 6/2006 | Devier et al. |
| 2016/0145827 A1 | 5/2016 | Kami et al. |
| 2021/0207340 A1* | 7/2021 | Honda ................... H04N 7/183 |
| 2021/0214919 A1* | 7/2021 | Okada ..................... E02F 9/265 |
| 2021/0230829 A1* | 7/2021 | Okada ................... E02F 9/2033 |

FOREIGN PATENT DOCUMENTS

| | | |
|---|---|---|
| JP | 2001-099106 | 4/2001 |
| JP | 2016-169572 | 9/2016 |
| JP | 2017-157016 | 9/2017 |
| JP | 2017-203322 | 11/2017 |
| WO | 2015/025986 | 2/2015 |
| WO | 2015/129930 | 9/2015 |

\* cited by examiner

SHOVEL AND INFORMATION PROCESSING APPARATUS

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/037888, filed on Sep. 26, 2019 and designating the U.S., which claims priority to Japanese patent application No. 2018-181987, filed on Sep. 27, 2018. The entire contents of the foregoing applications are incorporated herein by reference.

BACKGROUND

Technical Field

The present disclosure relates to shovels.

Description of Related Art

For example, a technique that uses a distance sensor or the like to recognize an end attachment attached to the distal end of a work attachment and obtain information on the attached attachment, such as size and weight, is known.

SUMMARY

According to an aspect of the present invention, a shovel includes a lower traveling structure, an upper swing structure swingably mounted on the lower traveling structure, a work attachment attached to the upper swing structure and including a boom, an arm attached to the boom, and an end attachment attached to the arm, a first obtaining device configured to obtain data on the pose state of the work attachment, and a second obtaining device configured to obtain data on the pose state of the lower traveling structure or the upper swing structure. Predetermined control related to the movement of the work attachment is executed based on the data obtained by the first and second obtaining devices. Information on the type of the end attachment is obtained, and a response characteristic of the work attachment or the details of an operation for the work attachment during the predetermined control are corrected based on the obtained information.

DETAILED DESCRIPTION

Using a distance sensor or the like to recognize an end attachment attached to the distal end of a work attachment and obtain information on the attached attachment may result in a complicated configuration to incur an increase in cost, etc.

Therefore, a technique that makes it easier to estimate an end attachment attached to a shovel and makes it possible to control the movement of an attachment according to the end attachment even after replacement of the end attachment is desired.

According to an aspect of the present invention, it is possible to provide a technique that makes it easier to estimate an end attachment attached to a shovel and makes it possible to control the movement of an attachment according to the end attachment even after replacement of the end attachment.

An embodiment of the invention is described below with reference to the drawings.

[Shovel Overview]

Figure 1:
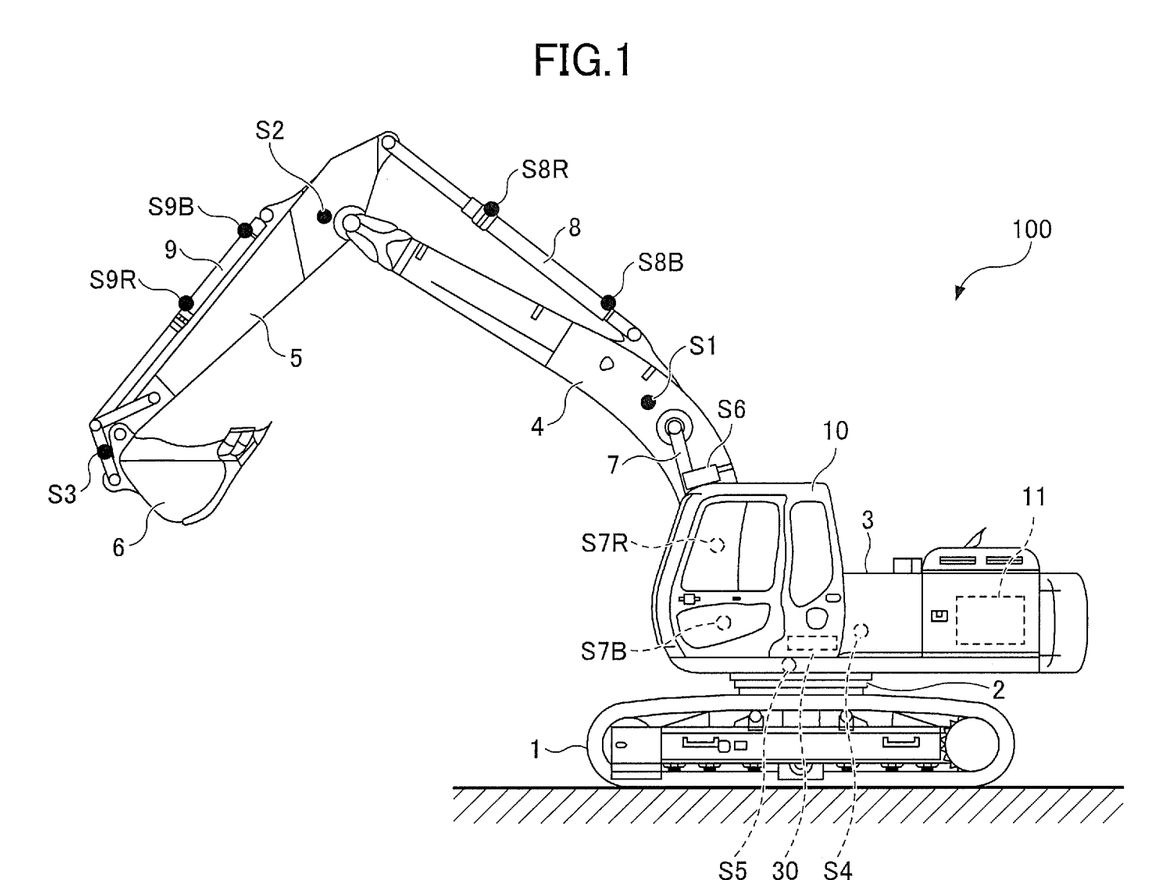
FIG. 1 is a side view of a shovel.

First, an overview of a shovel 100 according to this embodiment is given with reference to FIG. 1.

FIG. 1 is a side view of the shovel 100 according to this embodiment.

The shovel 100 according to this embodiment includes a lower traveling structure 1; an upper swing structure 3 swingably mounted on the lower traveling structure 1 via a swing mechanism 2; a boom 4, an arm 5, and an end attachment 6 that serve as an attachment (an example of a work attachment); and a cabin 10 in which an operator rides. In the following, the front side of the shovel 100 corresponds to a direction in which the attachment extends relative to the upper swing structure 3 (hereinafter simply referred to as "attachment extension direction") in a plan view looking at the shovel 100 from directly above along the swing axis of the upper swing structure 3 (hereinafter simply referred to as "plan view"). Furthermore, the left side and the right side of the shovel 100 correspond to the left side and the right side, respectively, of the operator in the cabin 10 in a plan view of the shovel 100.

The lower traveling structure 1 includes, for example, a pair of left and right crawlers, which are hydraulically driven by travel hydraulic motors 1L and 1R (see FIGS. 2 and 3), respectively, to cause the shovel 100 to travel.

The upper swing structure 3 is driven by a swing hydraulic motor 2A (see FIGS. 2 and 3) to swing relative to the lower traveling structure 1.

The boom 4 is pivotally attached to the front center of the upper swing structure to be able to rise and lower. The arm 5 is pivotally attached to the distal end of the boom 4 to be vertically pivotable. The end attachment 6 is pivotally attached to the distal end of the arm 5 to be vertically pivotable.

The end attachment 6 is attached to the distal end of the arm 5 in such a manner as to be suitably replaceable according to the work details of the shovel 100. For example, as illustrated in FIG. 1, the end attachment 6 is a bucket. The end attachment 6 may be other than a bucket, such as an agitator. Furthermore, the end attachment 6 may be attached to the arm 5 via a quick coupling.

The boom 4, the arm 5, and the end attachment 6 are hydraulically driven by a boom cylinder 7, an arm cylinder 8, and an end attachment cylinder 9, respectively, which serve as hydraulic actuators.

The cabin 10 is a cab in which the operator rides, and is mounted on the front left of the upper swing structure 3.

The shovel 100 moves driven elements such as the lower traveling structure 1, the upper swing structure 3, the boom 4, the arm 5, and the end attachment 6 in response to operations performed by the operator riding in the cabin 10 (hereinafter "riding operator" for convenience).

Furthermore, the shovel 100 may move moving elements (driven elements) such as the lower traveling structure 1, the upper swing structure 3, the boom 4, the arm 5, and the end attachment 6 in response to a remote control signal received from a predetermined external apparatus (for example, a management apparatus 200 as described below). That is, the shovel 100 may be remotely controlled. When the shovel 100 is remotely controlled, there may be no one in the cabin 10.

Furthermore, the shovel 100 may automatically operate hydraulic actuators, independent of the details of an operation performed by the riding operator of the cabin 10 or remote control performed by an operator of the external apparatus (hereinafter "remote operator" for convenience). With this, the shovel 100 implements the function of automatically moving at least one or more of driven elements such as the lower traveling structure 1, the upper swing structure 3, the boom 4, the arm 5, and the end attachment 6 (hereinafter, "automatic operation function"). Hereinafter, the riding operator and the remote operator may be collectively referred to as "operator."

The automatic operation function may include the function of automatically operating a driven element (hydraulic actuator) other than an operated driven element (hydraulic actuator) in response to the riding operator's operation or the remote control of the remote operator (so-called "semi-automatic operation function"). Furthermore, the automatic operation function may also include the function of automatically operating at least one or more of driven elements (hydraulic actuators) without the riding operator's operation or the remote control of the remote operator (so-called "fully automatic operation function"). When the fully automatic operation function is enabled in the shovel 100, there may be no one in the cabin 10. Furthermore, the automatic operation function may include the function of the shovel 100 recognizing the gesture of a person such as a worker around the shovel 100 and automatically operating one or more of driven elements (hydraulic actuators) according to the details of the recognized gesture ("gesture operation function"). Furthermore, the semi-automatic operation function, the fully automatic operation function, and the gesture operation function may include a mode in which the operation details of a driven element (hydraulic actuator) to be automatically operated are automatically determined according to predetermined rules. Furthermore, the semi-automatic operation function, the fully automatic operation function, and the gesture operation function may include a mode in which the shovel 100 autonomously performs various determinations and the operation details of a driven element (hydraulic actuator) to be automatically operated are autonomously determined along the determination results (so-called "autonomous operation function").

[Shovel Configuration]

Next, a specific configuration of the shovel 100 is described with reference to FIGS. 2 and 3 in addition to FIG. 1.

Figure 2:
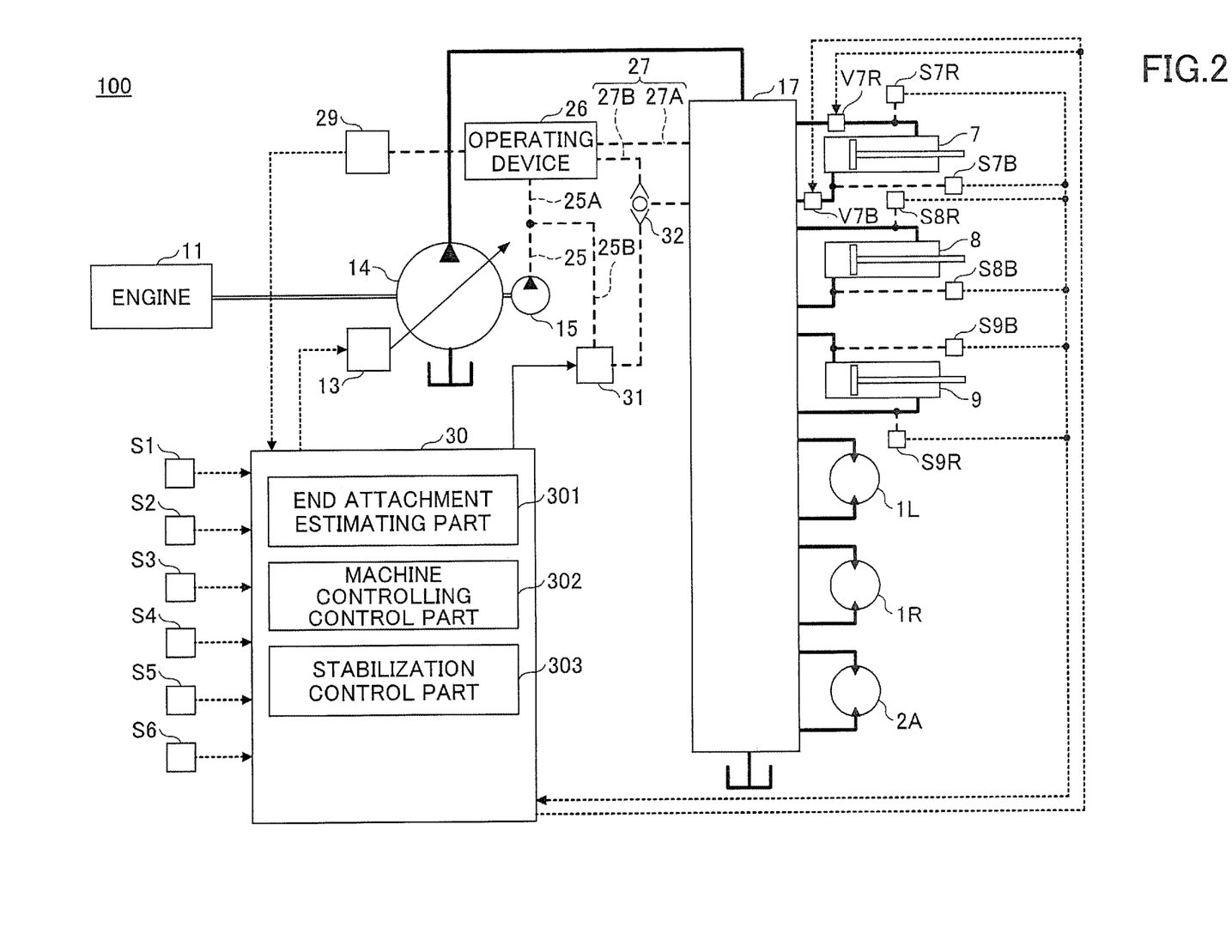
FIG. 2 is a block diagram illustrating an example configuration of the shovel.

FIG. 2 is a block diagram illustrating an example configuration of the shovel 100 according to this embodiment. FIG. 3 is a block diagram illustrating another example configuration of the shovel 100 according to this embodiment.

In the drawings, a mechanical power line, a high-pressure hydraulic line, a pilot line, and an electric drive and control line are indicated by a double line, a solid line, a dashed line, and a dotted line, respectively.

The hydraulic drive system of the shovel 100 according to this embodiment includes hydraulic actuators such as the travel hydraulic motors 1L and 1R, the swing hydraulic motor 2A, the boom cylinder 7, the arm cylinder 8, and the end attachment cylinder 9 that hydraulically drive the lower traveling structure 1, the upper swing structure 3, the boom 4, the arm 5, and the end attachment 6, respectively, as described above. Furthermore, the hydraulic drive system of the shovel 100 according to this embodiment includes an engine 11, a regulator 13, a main pump 14, and a control valve 17.

The engine 11 is a main power source in the hydraulic drive system and is mounted on the back of the upper swing structure 3, for example. Specifically, the engine 11 rotates constantly at a preset target rotational speed under the direct or indirect control of a controller 30 as described below to drive the main pump 14 and a pilot pump 15. The engine 11 is, for example, a diesel engine fueled with diesel fuel.

The regulator 13 controls the discharge quantity of the main pump 14. For example, the regulator 13 adjusts the angle (tilt angle) of the swash plate of the main pump 14 in response to a control command from the controller 30.

The main pump 14 is, for example, mounted on the back of the upper swing structure 3 the same as the engine 11, and supplies hydraulic oil to the control valve 17 through a high-pressure hydraulic line. As described above, the main pump 14 is driven by the engine 11. The main pump 14 is, for example, a variable displacement hydraulic pump. As described above, under the control of the controller 30, the tilt angle of the swash plate of the main pump 14 is adjusted by the regulator 13 to adjust the stroke length of its piston, so that its discharge flow rate (discharge pressure) is controlled.

The control valve 17 is a hydraulic control device that is mounted in the center of the upper swing structure 3 to control hydraulic actuators according to the details of the riding operator's operations on an operating device 26 or the details of remote control performed by the remote operator, for example. As described above, the control valve 17 is connected to the main pump 14 via a high-pressure hydraulic line to selectively supply hydraulic oil supplied from the main pump 14 to hydraulic actuators (the travel hydraulic motors 1L and 1R, the swing hydraulic motor 2A, the boom cylinder 7, the arm cylinder 8, and the end attachment cylinder 9) in accordance with the operator's operations. Specifically, the control valve 17 includes control valves that control the flow rate and the direction of flow of hydraulic oil supplied from the main pump 14 to the individual hydraulic actuators.

The operation system of the shovel 100 according to this embodiment includes the pilot pump 15, the operating device 26, and a shuttle valve 32.

The pilot pump 15 is, for example, mounted on the back of the upper swing structure 3 and supplies a pilot pressure to the operating device 26, etc., via a pilot line 25. The pilot pump 15 is, for example, a fixed displacement hydraulic pump and is driven by the engine 11 as described above.

The operating device 26 is provided near the operator seat of the cabin 10 and serves as an operation input part for the riding operator operating various moving elements (the lower traveling structure 1, the upper swing structure 3, the boom 4, the arm 5, the end attachment 6, etc.). In other words, the operating device 26 is an operation input part for the riding operator operating hydraulic actuators (namely, the travel hydraulic motors 1L and 1R, the swing hydraulic motor 2A, the boom cylinder 7, the arm cylinder 8, the end attachment cylinder 9, etc.) that drive corresponding moving elements.

Figure 3:
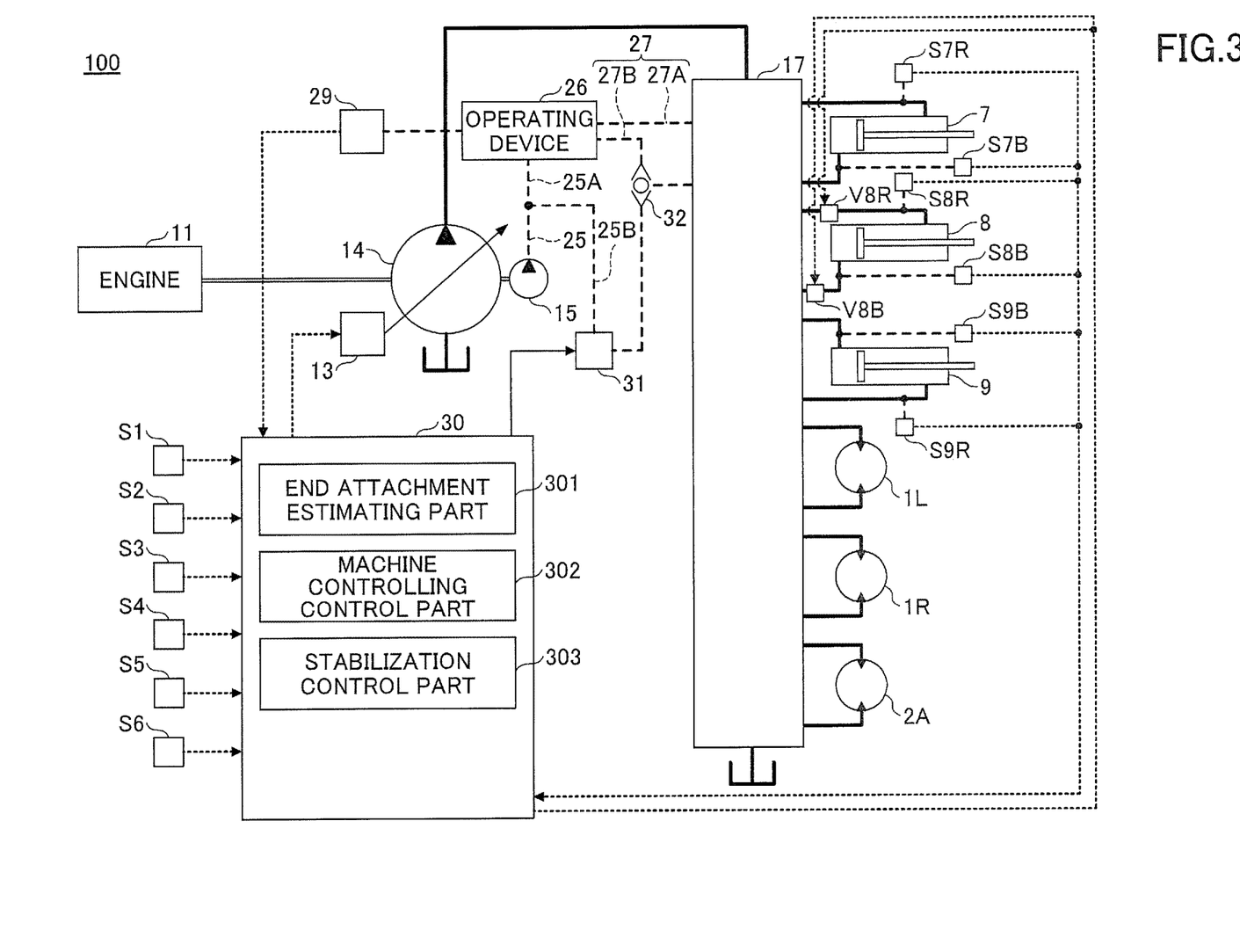
FIG. 3 is a block diagram illustrating another example configuration of the shovel.

As illustrated in FIGS. 2 and 3, the operating device 26 is, for example, of a hydraulic pilot type that uses hydraulic oil supplied from the pilot pump 15 through the pilot line 25 and a pilot line 25A branching from the pilot line 25. The operating device 26 outputs a pilot pressure commensurate with the operation details of the operating device 26 to a pilot line 27 on its secondary side, using hydraulic oil supplied from the pilot pump 15. The pilot line 27 includes a pilot line 27A directly connected to the control valve 17. This causes a pilot pressure commensurate with the operation details of the operating device 26 associated with one or more of various moving elements (for example, the lower traveling structure 1 and the upper swing structure 3) to be directly input to the control valve 17. Furthermore, the pilot line 27 includes a pilot line 27B that is indirectly connected to the control valve 17 via the shuttle valve 32. This allows a pilot pressure commensurate with the operation details of the operating device 26 associated with a remaining one or more of the various moving elements (for example, the boom 4, the arm 5, and the end attachment 6) to be indirectly input to the control valve 17 via the shuttle valve 32. Therefore, the control valve 17 can achieve the respective operations of hydraulic actuators corresponding to the operation details of the operating device 26 performed by the riding operator or the like.

Furthermore, the operating device 26 may also be, for example, of an electric type that outputs an electrical signal corresponding to the operation details (hereinafter "operation signal"). In this case, the pilot line 27 and the shuttle valve 32 are omitted, so that hydraulic oil output from a proportional valve 31 is directly supplied to the control valve 17 without intervention of the shuttle valve 32. The operation signal output from the operating device 26 is, for example, fed into the controller 30, so that the controller 30 outputs a control signal corresponding to the operation details of the operating device 26 to the below-described proportional valve 31 in response to the operation signal. This causes a pilot pressure commensurate with the operation details of the operating device 26 to be supplied from the proportional valve 31 to the control valve 17. Therefore, the control valve 17 can achieve the respective operations of hydraulic actuators corresponding to the details of operations performed on the operating device 26 by the riding operator or the like.

The operating device 26 includes, for example, lever devices with which to operate the boom 4 (the boom cylinder 7), the arm 5 (the arm cylinder 8), the end attachment 6 (the end attachment cylinder 9), and the upper swing structure 3 (the swing hydraulic motor 2A). Furthermore, the operating device 26 includes, for example, pedal devices or lever devices with which to operate the left and right crawlers of the lower traveling structure 1 (the travel hydraulic motors 1L and 1R).

The pilot line 27 may all be connected to the control valve 17 via the shuttle valve 32. That is, pilot pressures commensurate with the operation details of the operating device 26 associated with all moving elements may be input to the control valve 17 via the shuttle valve 32.

The shuttle valve 32 includes two inlet ports and one outlet port, and outputs hydraulic oil having the higher one of the pilot pressures input to the two inlet ports to the outlet port. Of the two inlet ports of the shuttle valve 32, one is connected to the operating device 26 (specifically, the above-described lever device or pedal device included in the operating device 26), and the other is connected to the proportional valve 31. The output port of the shuttle valve 32 is connected to the pilot ports of a corresponding control valve (specifically, a control valve corresponding to a hydraulic actuator that is operated with the above-described lever device or pedal device connected to the one inlet port of the shuttle valve 32) in the control valve 17 through a pilot line. For example, the shovel 100 includes the shuttle valves 32 corresponding to lever devices with which to operate the boom 4 (the boom cylinder 7), the arm 5 (the arm cylinder 8), and the end attachment 6 (the end attachment cylinder 9). In this case, the output ports of these shuttle valves 32 are connected to control valves corresponding to the boom cylinder 7, the arm cylinder 8, and the end attachment cylinder 9. Therefore, each of these shuttle valves 32 can cause the higher one of the pilot pressure generated by the operating device 26 (lever device) and the pilot pressure generated by the proportional valve 31 to act on a pilot port of the corresponding control valve. That is, by causing a pilot pressure higher than the secondary-side pilot pressure output from the operating device 26 (lever device) to be output from the proportional valve 31, the below-described controller 30 can automatically control the movement of the attachment (at least one of the boom 4, the arm 5, and the end attachment 6) by controlling a corresponding control valve, independent of the riding operator's operation on the operating device 26.

With respect to a lever device or pedal device with which to operate the lower traveling structure 1, the pilot line 27 on the secondary side may be connected to a corresponding control valve in the control valve 17 via the shuttle valve 32. The same is true for a lever device with which to operate the upper swing structure 3. This enables the controller 30 to control the movement of the lower traveling structure 1 or the upper swing structure 3 by controlling a corresponding control valve independent of the riding operator's operation on the operating device 26, the same as in the case of the attachment.

As illustrated in FIG. 2, the control system of the shovel 100 according to this embodiment includes the controller 30, an operating pressure sensor 29, the proportional valve 31, a boom pose sensor S1, an arm pose sensor S2, an end attachment pose sensor S3, a machine body tilt sensor S4, a swing state sensor S5, an image capturing device S6, a boom bottom pressure sensor S7B, a boom rod pressure sensor S7R, an arm bottom pressure sensor S8B, an arm rod pressure sensor S8R, an end attachment bottom pressure sensor S9B, an end attachment rod pressure sensor S9R, and relief valves V7B and V7R. Furthermore, as illustrated in FIG. 3, the control system of the shovel 100 according to this embodiment may include relief valves V8B and V8R in place of the relief valves V7B and V7R. Furthermore, the shovel 100 according to this embodiment may include both the relief valves V7B and V7R and the relief valves V8B and V8R.

The controller 30 controls the driving of the shovel 100. The functions of the controller 30 may be implemented by desired hardware or a combination of hardware and software. For example, the controller 30 is constituted mainly of a microcomputer that includes a CPU (Central Processing Unit), a memory unit such as a RAM (Random Access Memory), a non-volatile secondary storage such as a ROM (Read Only Memory), and various input/output interface devices. The controller 30 includes an end attachment estimating part 301, a machine controlling control part 302, and a stabilization control part 303 as functional parts implemented by, for example, executing, on the CPU, one or more programs installed in the non-volatile secondary storage or the like.

One or more of the functions of the controller 30 may be implemented by another controller (control device). That is, the functions of the controller 30 may be distributed among and implemented by multiple controllers.

The operating pressure sensor 29 detects the pilot pressure of the secondary side (the pilot lines 27A and 27B) of the operating device 26, that is, a pilot pressure corresponding to the operating state of each moving element (hydraulic actuator) at the operating device 26. A detection signal of a pilot pressure corresponding to the operating state of the operating device 26 with respect to the lower traveling structure 1, the upper swing structure 3, the boom 4, the arm 5, the end attachment 6, etc., generated by the operating pressure sensor 29, is fed into the controller 30.

The proportional valve 31 is provided in a pilot line 25B branching from the pilot line 25 and connected to the shuttle valve 32, and is configured to be able to change its flow area (a cross-sectional area through which hydraulic oil can pass). This allows the proportional valve 31 to output a predetermined pilot pressure to the secondary side and cause it to act on the other inlet port of the shuttle valve 32, using the hydraulic oil of the pilot pump 15 supplied through the pilot line 25 and the pilot line 25B. For example, when the shuttle valves 32 corresponding to the boom 4 (the boom cylinder 7), the arm 5 (the arm cylinder 8), and the end attachment 6 (the end attachment cylinder 9) are provided as described above, the corresponding proportional valves 31 are provided one for each shuttle valve 32. The proportional valve operates in response to a control command input from the controller 30. This enables the controller 30 to cause hydraulic oil discharged by the pilot pump 15 to be supplied to a pilot port of a control valve corresponding to the movement of the attachment (the boom 4, the arm 5, or the end attachment 6) in the control valve 17 via the proportional valve 31 and the shuttle valve 32, even when the operating device 26 (specifically, the above-described lever devices) is not operated by the riding operator.

For example, the controller 30 may output a control command corresponding to the details of remote control to the proportional valve 31 in response to a remote control signal received from the external apparatus. This causes a pilot pressure commensurate with the details of remote control to be supplied from the proportional valve 31 to the control valve 17 via the shuttle valve 32. Therefore, the control valve 17 can achieve the operation of each hydraulic actuator corresponding to the details of remote control corresponding to the remote control signal.

Furthermore, for example, the controller 30 may output a control command corresponding to the automatic operation function to the proportional valve 31, independent of the operation details of the operating device 26 or the details of remote control corresponding to a remote control signal. This causes a pilot pressure corresponding to the automatic operation function to be supplied from the proportional valve 31 to the control valve 17 via the shuttle valve 32. Therefore, the control valve 17 can achieve the operation of each hydraulic actuator corresponding to the automatic operation function.

The boom pose sensor S1 is attached to the boom 4 to detect the pose angle, specifically, the elevation angle, of the boom 4 relative to the upper swing structure 3 (hereinafter "boom angle"). The boom pose sensor S1, for example, detects the angle of a straight line connecting the pivot points of the boom 4 at its both ends to the swing plane of the upper swing structure 3 in a side view. Examples of the boom pose sensor S1 may include a rotary encoder, an acceleration sensor, an angular acceleration sensor, a six-axis sensor, and an IMU (Inertial Measurement Unit), which is hereinafter also the case with the arm pose sensor S2, the end attachment pose sensor S3, and the machine body tilt sensor S4. A detection signal corresponding to the boom angle detected by the boom pose sensor S1 is fed into the controller 30.

The arm pose sensor S2 is attached to the arm 5 to detect the pose angle, specifically, the pivot angle, of the arm 5 relative to the boom 4 (hereinafter "arm angle"). The arm pose sensor S2, for example, detects the angle of a straight line connecting the pivot points of the arm 5 at its both ends to the straight line connecting the pivot points of the boom 4 at its both ends in a side view. A detection signal corresponding to the arm angle detected by the arm pose sensor S2 is fed into the controller 30.

The end attachment pose sensor S3 is attached to the end attachment 6 to detect the pose angle, specifically the pivot angle, of the end attachment 6 relative to the arm 5 (hereinafter "end attachment angle"). The end attachment pose sensor S3, for example, detects the angle of a straight line connecting the pivot point and the distal end (blade edge in the case of a bucket) of the end attachment 6 to the straight line connecting the pivot points of the arm 5 at its both ends in a side view. A detection signal corresponding to the end attachment angle detected by the end attachment pose sensor S3 is fed into the controller 30.

The machine body tilt sensor S4 detects the tilt state of the machine body (for example, the upper swing structure 3) relative to a predetermined reference plane (for example, a horizontal plane). The machine body tilt sensor S4 is, for example, attached to the upper swing structure 3 to detect the tilt angles of the shovel 100 (namely, the upper swing structure 3) about two axes in its longitudinal direction and lateral direction (hereinafter "longitudinal tilt angle" and "lateral tilt angle"). Detection signals corresponding to the tilt angles (longitudinal tilt angle and lateral tilt angle) detected by the machine body tilt sensor S4 are fed into the controller 30.

The swing state sensor S5 is attached to the upper swing structure 3 to output detection information regarding the swing state of the upper swing structure 3. The swing state sensor S5 detects, for example, the swing angular velocity and the swing angle of the upper swing structure 3. Examples of the swing state sensor S5 include a gyroscope, a resolver, and a rotary encoder. The detection information regarding the swing state detected by the swing state sensor S5 is fed into the controller 30.

When the machine body tilt sensor S4 includes a gyroscope, a six-axis sensor, an IMU or the like that can detect angular velocities about three axes, the swing state (for example, the swing angular velocity) of the upper swing structure 3 may be detected based on a detection signal of the machine body tilt sensor S4. In this case, the swing state sensor S5 may be omitted.

The image capturing device S6 captures an image of an area surrounding the shovel 100.

As illustrated in FIG. 1, the image capturing device S6 includes, for example, a front camera that is attached to the upper surface of the front of the upper swing structure 3 (for example, the upper surface of the cabin 10) to capture an image of an area in front of the shovel 100. The attachment including the end attachment 6 is included (shown) in image information (a captured image) output from the front camera. Furthermore, the image capturing device S6 may also include at least one of a back camera, a left camera, and a right camera that capture images of areas behind, to the left, and to the right, respectively, of the shovel 100. The image information output from the image capturing device S6 is fed into the controller 30.

For example, the controller 30 may have a surrounding image displaying function to generate an image showing the surroundings (hereinafter "surrounding image") of the shovel 100 based on the image information of the image capturing device S6 and displays the image on a display installed in the cabin 10. This enables the riding operator of the shovel 100 to be aware of the situation of a location that is difficult to see directly around the shovel 100 based on a surrounding image displayed on the display in the cabin 10.

Furthermore, for example, in the case where the shovel 100 is remotely controlled, the controller 30 may have an image information uploading function to transmit the image information of the image capturing device S6 to an external apparatus (for example, the management apparatus 200) in real time. This enables the remote operator at the external apparatus to remotely control the shovel 100 while checking the surroundings of the shovel 100 based on the image information of the image capturing device S6 displayed on a display installed on the external apparatus.

Furthermore, for example, the controller 30 may have a surroundings monitoring function to monitor the entry of an object that is a predetermined monitoring target into a predetermined area (hereinafter "monitoring area") around the shovel 100 based on the image information of the image capturing device S6. The monitoring target object may include a person, an animal, a work vehicle (for example, a dump truck), a construction machine (for example, another shovel, bulldozer, or the like), a wall, a fence, a hole, a helmet, and a safety vest. In response to detecting the entry of a monitoring target object into the monitoring area, the controller 30 may cause an alarm to be output inside the cabin 10 or over the area around the shovel 100 through a predetermined audio output device or restrict the movement of a driven element (hydraulic actuator) of the shovel 100. This makes it possible to improve the safety of the shovel 100.

The boom rod pressure sensor S7R and the boom bottom pressure sensor S7B are attached to the boom cylinder 7 to detect the pressure of the rod-side oil chamber (hereinafter "boom rod pressure") and the pressure of the bottom-side oil chamber (hereinafter "boom bottom pressure), respectively, of the boom cylinder 7. Detection signals corresponding to the boom rod pressure and the boom bottom pressure detected by the boom rod pressure sensor S7R and the boom bottom pressure sensor S7B, respectively, are fed into the controller 30.

The arm rod pressure sensor S8R and the arm bottom pressure sensor S8B detect the pressure of the rod-side oil chamber (hereinafter "arm rod pressure") and the pressure of the bottom-side oil chamber (hereinafter "arm bottom pressure), respectively, of the arm cylinder 8. Detection signals corresponding to the arm rod pressure and the arm bottom pressure detected by the arm rod pressure sensor S8R and the arm bottom pressure sensor S8B, respectively, are fed into the controller 30.

The end attachment rod pressure sensor S9R and the end attachment bottom pressure sensor S9B detect the pressure of the rod-side oil chamber (hereinafter "end attachment rod pressure") and the pressure of the bottom-side oil chamber (hereinafter "end attachment bottom pressure), respectively, of the end attachment cylinder 9. Detection signals corresponding to the end attachment rod pressure and the end attachment bottom pressure detected by the end attachment rod pressure sensor S9R and the end attachment bottom pressure sensor S9B, respectively, are fed into the controller 30.

The relief valves V7B and V7R discharge hydraulic oil in the bottom-side oil chamber and the rod-side oil chamber, respectively, of the boom cylinder 7 to a hydraulic oil tank to reduce pressure in response to a control command from the controller 30. For example, the relief valves V7B and V7R are provided in a high-pressure hydraulic line between the bottom-side oil chamber of the boom cylinder 7 and the control valve 17 and a high-pressure hydraulic line between the rod-side oil chamber of the boom cylinder 7 and the control valve 17, respectively. Furthermore, the relief valves V7B and V7R may be housed in the control valve 17. In this case, the relief valves V7B and V7R are provided in oil passages on the boom cylinder 7 side of control valves corresponding to the boom cylinder 7 housed in the control valve 17. The relief valves V7B and V7R are, for example, solenoid relief valves.

The relief valves V8B and V8R discharge hydraulic oil in the bottom-side oil chamber and the rod-side oil chamber, respectively, of the arm cylinder 8 to the hydraulic oil tank to reduce pressure in response to a control command from the controller 30. For example, the relief valves V8B and V8R are provided in a high-pressure hydraulic line between the bottom-side oil chamber of the arm cylinder 8 and the control valve 17 and a high-pressure hydraulic line between the rod-side oil chamber of the arm cylinder 8 and the control valve 17, respectively. Furthermore, the relief valves V8B and V8R may be housed in the control valve 17. In this case, the relief valves V8B and V8R are provided in oil passages on the arm cylinder 8 side of control valves corresponding to the arm cylinder 8 housed in the control valve 17. The relief valves V8B and V8R are, for example, solenoid relief valves.

The end attachment estimating part 301 estimates the weight, size, or type of the end attachment 6 attached to the distal end of the arm 5. In other words, the end attachment estimating part 301 estimates the end attachment 6 attached to the distal end of the arm 5 to obtain information on its weight, information on its size, or information on its type. In this case, when the end attachment 6 is attached to the arm 5 via a quick coupler, the end attachment estimating part 301 may treat a combination of the quick coupler and the end attachment attached to the quick coupler as "the end attachment 6." Hereinafter, the end attachment actually attached to the distal end of the arm 5 is referred to as "the end attachment 6," and a general end attachment that may be attached to the distal end of the arm 5 is described without adding a reference numeral.

The size of the end attachment includes a length from a position at which the end attachment is attached to the arm 5 (the position of a link pin to the arm 5) to the distal end of the end attachment (for example, the blade edge of a bucket) (hereinafter "link length"). Furthermore, the type of the end attachment is not a type based on functional classifications of end attachments but a type based on at least one of weight classifications and size classifications of end attachments. For example, when buckets differ in weight or size (link length), the buckets are treated as different types of end attachments.

For example, the end attachment estimating part 301 estimates the weight or link length of the end attachment 6 by comparing the predicted value of the thrust of a hydraulic cylinder (the boom cylinder 7, the arm cylinder 8, or the end attachment cylinder 9) that drives the attachment (hereinafter "cylinder thrust") based on a predetermined standard end attachment (hereinafter, "standard end attachment") and the actual measured value of the cylinder thrust during the aerial movement of the attachment. This is because the thrust of a hydraulic cylinder changes depending on the weight or link length of the end attachment 6. Specifically, the end attachment estimating part 301 may estimate the weight or link length of the end attachment 6 by comparing the predicted value and the measured value of the cylinder thrust with respect to at least two of the boom cylinder 7, the arm cylinder 8, and the end attachment cylinder 9. This is because the thrust of the arm cylinder 8 or the end attachment cylinder 9 may be substantially zero irrespective of the weight or link length of the end attachment 6, so that it is desirable that the weight or link length of the end attachment 6 be estimated based on the results of comparison of the predicted value and the measured value of the cylinder thrust with respect to multiple hydraulic cylinders. Specifically, the thrust of the arm cylinder 8 or the end attachment cylinder 9 is substantially zero when the position of the center of gravity of the arm 5 or the end attachment 6 is near a position directly below (immediately below) in a vertical direction as seen from its proximal end side connection position (the position of a link pin between the boom 4 and the arm 5 or between the arm 5 and the end attachment 6). In the case of the boom cylinder 7, however, because the thrust never becomes zero, the weight or link length of the end attachment 6 may be estimated only by comparing the predicted value and the measured value of the thrust of the boom cylinder 7. The standard end attachment is, for example, the end attachment that is most frequently used in the shovel 100, and may be a bucket of standard size and weight. The predicted values of the cylinder thrusts of hydraulic cylinders that drive the attachment may be derived based on the weight, the link length, the position of the center of gravity, etc., of the known attachment (the boom 4, the arm 5, and the standard end attachment) and measured values (the angular acceleration or the like of the boom 4, the arm 5, and the end attachment 6) representing the operating state of the attachment based on the detection values of the sensors S1 through S4. Furthermore, the measured values of the cylinder thrusts may be derived based on the boom rod pressure and the boom bottom pressure, the arm rod pressure and the arm bottom pressure, and the end attachment rod pressure and the end attachment bottom pressure detected by the sensors S7B, S7R, S8B, S8R, S9B and S9R.

The controller 30 can determine whether the attachment is during its aerial operation based on the load state of the boom cylinder 7, the arm cylinder 8, and the end attachment cylinder 9 or the pose state of the attachment (the boom 4, the arm 5, and the end attachment 6). In this case, the controller 30 can determine the load state of the boom cylinder 7, the arm cylinder 8, and the end attachment cylinder 9 based on the detection values of the boom bottom pressure sensor S7B, the boom rod pressure sensor S7R, the arm bottom pressure sensor S8B, the arm rod pressure sensor S8R, the end attachment bottom pressure sensor S9B, and the end attachment rod pressure sensor S9R. Furthermore, the controller 30 can determine the pose state of the attachment based on the boom angle, the arm angle, and the end attachment angle detected by the boom pose sensor S1, the arm pose sensor S2, and the end attachment pose sensor S3. Furthermore, the controller 30 may determine that the attachment is moving in the air by detecting a specific work situation of the shovel 100 in which the attachment moves in the air. For example, the controller 30 may determine that the attachment is moving in the air by detecting the boom raising and swing motion of the shovel 100 for discharging soil or performing loading into a truck based on the operating condition of the operating device 26 or the detection values of the boom pose sensor S1, the arm pose sensor S2, and the end attachment pose sensor S3. In this case, the boom raising and swing motion of the shovel 100 is a complex motion of the shovel 100 in which the motion of raising the boom 4 and a swing motion are simultaneously performed. Furthermore, the riding operator or the like may press a switch provided in the cabin 10 for indicating that the attachment is during its aerial movement to notify the controller 30 that the attachment is during its aerial movement.

The end attachment estimating part 301 determine that the end attachment 6 attached to the distal end of the arm 5 is a standard end attachment if the difference between the predicted value and the measured value of the cylinder thrust is less than or equal to a predetermined threshold. The end attachment estimating part 301 sets the estimated value of the weight or link length of the end attachment 6 as the weight or link length of the known standard end attachment.

If the difference between the predicted value and the measured value of the cylinder thrust is more than the predetermined threshold, the end attachment estimating part 301 determines that the end attachment 6 attached to the distal end of the arm 5 is an end attachment different from a standard end attachment (hereinafter "non-standard end attachment"). The end attachment estimating part 301 derives the estimated value of the weight or link length of the end attachment 6 based on the measured value of the cylinder thrust. For example, the end attachment estimating part 301 may calculate the weight or link length of the end attachment based on the measured value of the cylinder thrust, the detected value of the end attachment angle detected by the end attachment pose sensor S3, etc., and set the calculated weight or link length as the estimated value at a certain point during the aerial movement of the attachment. The end attachment estimating part 301 may also set the estimated value of the weight or link length of the end attachment 6, using a change over a certain period (for example, from a few minutes to a few dozen minutes) in the weight or link length of the end attachment 6 calculated based on the measured value of the cylinder thrust, the detected value of the end attachment angle, etc., during the aerial movement of the attachment. Specifically, when the change of the weight or link length of the end attachment 6 calculated over a certain period is relatively small, the end attachment estimating part 301 determines that there has been no work of loading a bucket serving as the end attachment 6 with earth or the like. Then, the end attachment estimating part 301 sets the average of the calculated values of the weight of the end attachment 6 during the certain period as the estimated value of the weight of the end attachment 6. In contrast, when the change of the weight or link length of the end attachment 6 calculated over a certain period is relatively large, the end attachment estimating part 301 determines that there has been work of loading a bucket serving as the end attachment 6 with earth or the like. Then, the end attachment estimating part 301 excludes a period during which the bucket is loaded with earth or the like and thereafter sets the average of the calculated values of the weight of the end attachment 6 during the certain period as the estimated value of the weight of the end attachment 6. This makes it possible to appropriately estimate the weight or link length of the end attachment 6 even when a bucket serving as the end attachment 6 is loaded with earth or the like.

The end attachment estimating part 301 may set the estimated value of the weight or link length of the end attachment 6 in the above-described manner only when a bucket serving as the end attachment 6 is not loaded with earth or the like. In other words, when a bucket serving as the end attachment 6 is loaded with earth or the like, the end attachment estimating part 301 may stop the process of estimating the weight or link length of the end attachment 6 even during the aerial movement of the attachment. In this case, the end attachment estimating part 301 can determine whether a bucket serving as the end attachment 6 is loaded with earth or the like by, for example, comparing the current load state of the boom cylinder 7, the arm cylinder 8, and the end attachment cylinder 9 with their load state during aerial movement at another point of time. Furthermore, the end attachment estimating part 301 may also determine whether a bucket serving as the end attachment 6 is loaded with earth or the like based on an image captured by an image capturing device (not depicted) mounted on the upper swing structure 3 and capable of capturing an image of an area in front including the attachment.

Furthermore, for example, the end attachment estimating part 301 may estimate the type of the end attachment 6 attached to the distal end of the arm 5 among multiple types of end attachments that are pre-recorded (examples of possible end attachments; hereinafter "recorded end attachments").

Specifically, first, the end attachment estimating part 301 may determine whether the end attachment 6 attached to the distal end of the arm 5 is a standard end attachment or a non-standard end attachment in the same manner as in the case of estimating the weight or link length of the end attachment 6. In response to determining that the end attachment 6 attached to the distal end of the arm 5 is a standard end attachment, the end attachment estimating part 301 estimates that the type of the end attachment is "standard end attachment."

In response to determining that the end attachment 6 attached to the distal end of the arm 5 is a non-standard end attachment, the end attachment estimating part 301 may estimate the type of the end attachment 6 by calculating the weight or link length of the end attachment 6 in the same manner as described above and comparing the calculated value of the weight or link length of the end attachment 6 with the recorded values of the weights or link lengths of the recorded end attachments. This makes it possible to estimate the type of the end attachment 6 among the recorded end attachments, which are recorded in advance, and adopt the weight or link length of the recorded end attachment of the estimated type as the weight or link length of the end attachment 6. Therefore, it is possible to obtain (estimate) the weight or link length of the end attachment 6 with more accuracy than in the case of directly estimating the weight of the end attachment 6 from the detection values of various sensors.

Furthermore, the end attachment estimating part 301 may consider whether a bucket serving as the end attachment 6 is loaded with earth or the like (an example of a predetermined target object) in estimating the type of the end attachment 6.

Specifically, when a bucket serving as the end attachment 6 is not loaded with earth or the like, the end attachment estimating part 301 estimates the type of the end attachment 6 in the same manner as described above.

In contrast, when a bucket serving as the end attachment 6 is loaded with earth or the like, the end attachment estimating part 301 estimates the type of the end attachment 6 in a manner different from the above-described manner. Specifically, the end attachment estimating part 301 may estimate the type of the end attachment based on the pose of a bucket serving as the end attachment 6. In this case, the pose of the bucket means not the pose angle of the bucket relative to the arm 5 but the absolute pose angle of the bucket as seen from outside the shovel 100. For example, when the difference between the measured value of the pose angle of the bucket based on the detection values of the boom pose sensor S1, the arm pose sensor S2, the end attachment pose sensor S3, and the machine body tilt sensor S4 and a determined value corresponding to the normal pose of the bucket loaded with earth or the like is relatively small, the end attachment estimating part 301 estimates the type of the end attachment 6 to be "standard end attachment." The normal pose of the bucket loaded with earth or the like may correspond to, for example, a state where the opening of the bucket is substantially horizontal in a side view of the attachment. When the difference between the measured value of the pose angle of the bucket and a determined value corresponding to the normal pose of the bucket loaded with earth or the like is relatively large, the end attachment estimating part 301 estimates the type of the end attachment 6 to be "non-standard end attachment." This is because it is believed that the operator or the like normally performs operations according to a standard end attachment and changing the end attachment from a standard end attachment to a non-standard end attachment therefore causes the pose angle of the bucket to relatively increase a difference from the normal pose. Furthermore, this is because when the end attachment 6 is attached to the arm 5 via a quick coupling, the intervention of the quick coupling causes the measured value of the pose angle of the bucket based on the detection values of the boom pose sensor S1, the arm pose sensor S2, and the end attachment pose sensor S3 to be a value relatively distant from the determined value corresponding to the normal pose although the bucket is actually in its normal pose.

Furthermore, for example, the end attachment estimating part 301 may estimate the weight, size, or type of the end attachment based on image information in which the end attachment is included (shown) output from the image capturing device S6. This enables the controller 30 to implement an end attachment estimating function to estimate the type, etc., of the end attachment, using the image capturing device S6 used for multiple functions as described above. Therefore, the shovel 100 can more easily estimate the attached end attachment.

Specifically, the end attachment estimating part 301 recognizes the end attachment 6 included in the image information using predetermined image recognition techniques. The end attachment estimating part 301 may then determine whether the recognized end attachment 6 corresponds to one of multiple types of pre-recorded end attachments or is an end attachment of a type other than the pre-recorded types. The end attachment estimating part 301 may estimate the weight or size of the recognized end attachment 6 by comparing the size of the recognized end attachment 6 with the size of the boom 4 or the arm 5 included in the image information.

Furthermore, the end attachment estimating part 301 may read identification information pre-installed on the end attachment 6 using predetermined image recognition techniques to estimate the weight, size, or type of the end attachment 6 included in the image information based on the read identification information. Examples of the identification information include an ID (Identifier) expressed as an alphanumeric string, a QR code (registered trademark), and a barcode. In this case, information that correlates the identification information with at least one of the corresponding weight, size, and type with respect to each end attachment 6 is pre-recorded in the secondary storage of the controller 30 or an external non-volatile storage that can communicate with the controller 30. This enables the end attachment estimating part 301 to refer to the pre-recorded information to estimate (identify) the type, etc., of the end attachment 6 from the read identification information of the end attachment 6.

The machine controlling control part 302 performs control associated with the automatic operation function of the shovel 100. For example, the machine controlling control part 302 performs control related to a machine controlling function (a semi-automatic operation function) to assist the operator in operating the attachment (hereinafter "machine controlling control"). Specifically, the machine controlling control part 302 automatically assists the operator in manually operating the shovel 100 by automatically operating hydraulic actuators. In this case, as described above, the machine controlling control part 302 individually and automatically adjusting pilot pressures acting on control valves corresponding to the hydraulic actuators by controlling the proportional valve 31. This enables the machine controlling control part 302 to automatically operate individual hydraulic actuators to implement the machine controlling function.

More specifically, when the operator is manually performing the operation of closing the arm 5 (hereinafter "arm closing operation"), the machine controlling control part 302 may automatically extend or retract at least one of the boom cylinder 7, the arm cylinder 8, and the end attachment cylinder 9 so that a predetermined part of the end attachment 6 that is a target of control (hereinafter "control target part"), for example, the blade edge or the back surface of a bucket, moves along a predetermined intended trajectory. For example, as the operation of closing the arm 5 is performed, the machine controlling control part 302 automatically extends or retracts at least one of the boom cylinder 7, the arm cylinder 8, and the end attachment cylinder 9 so that the position of the control target part such as the teeth tips or the back surface of a bucket coincides with a preset intended work surface. In this case, the machine controlling control part 302 outputs a control command to the proportional valve 31 corresponding to a hydraulic actuator that is a target of automatic control so that the position coincides with the intended work surface, while sequentially calculating the position (coordinate points) of the teeth tips or the back surface of the bucket. This enables the operator to close the arm 5 while causing the teeth tips of the bucket to coincide with the intended work surface by performing the arm closing operation alone, for example. The automatic control may be executed when a predetermined button switch (hereinafter "MC (Machine Control) switch") installed in the cabin 10 or an external apparatus is pressed by the riding operator or the remote operator. The MC switch may be provided at the top end of the operating device 26 (lever device), for example. The MC switch may also be provided at the top end of an operating device (lever device) with which the remote operator inputs operations associated with the attachment (hereinafter "remote controller").

Furthermore, the machine controlling control part 302 changes a control parameter associated with the machine controlling function according to the weight, link length, or type of the end attachment 6 estimated by the end attachment estimating part 301. This is because even when the same control command is output to the proportional valve 31, a difference in the weight or link length of the end attachment 6 changes a response characteristic of the attachment to the control command. This is also because a difference in the link length of the end attachment 6 changes the position of the control target part (for example, the back surface or the blade edge of a bucket). In other words, the machine controlling control part 302 may correct a response characteristic of the attachment to the operator's operation with respect to the machine controlling function, based on the weight, link length, or type of the end attachment 6 estimated by the end attachment estimating part 301. Furthermore, the machine controlling control part 302 may correct the relative position (coordinates) of the control target part of the end attachment 6 in the machine controlling function, based on the link length or type of the end attachment 6. This enables the machine controlling control part 302 to correct (adjust) a response characteristic of the attachment to achieve appropriate work with the machine controlling function of the shovel 100 even when the end attachment 6 is replaced. Specifically, a conversion table or the like that represents the relationship between the weight of the end attachment 6 and a control parameter may be prestored in the internal memory or the like of the controller 30, and the machine controlling control part 302 may change a control parameter based on the conversion table or the like. The same is the case with a control parameter associated with stabilization control as described below.

Instead of correcting a response characteristic of the attachment to the operator's operation, the machine controlling control part 302 may correct the operation details of the operator so that the same response characteristic is obtained. The operation details of the operator may include the details of the riding operator's operation on the operating device 26 and the details of the remote operator's remote control corresponding to a remote control signal.

Furthermore, the machine controlling control part 302 may be configured to be able to execute control related to a fully automatic operation function instead of or in addition to the machine controlling function (semi-automatic operation function). In this case, the machine controlling control part 302 may correct a control parameter associated with the fully automatic operation function according to the weight, link length, or type of the end attachment 6 estimated by the end attachment estimating part 301. This enables the machine controlling control part 302 to correct a response characteristic of the attachment to an operation command for the attachment corresponding to the fully automatic operation function to achieve appropriate work with the fully automatic operation function of the shovel 100. Furthermore, the machine controlling control part 302 may correct an operation command corresponding to the fully automatic operation function instead of correcting a response characteristic of the attachment.

The stabilization control part 303 performs control related to the stabilization of the pose of the shovel 100 (hereinafter "stabilization control").

For example, when a lift of the back of the shovel 100 (the lower traveling structure 1) is likely to occur or when the lift has occurred because of the movement of the attachment or the lower traveling structure 1 responsive to the operator's operation, the stabilization control part 303 may control the relief valve V7B to discharge hydraulic oil in the bottom-side oil chamber of the boom cylinder 7 to the tank to release pressure. Furthermore, when a lift of the back of the shovel 100 (the lower traveling structure 1) is likely to occur or when the lift has occurred because of the movement of the attachment or the lower traveling structure 1 responsive to the operator's operation, the stabilization control part 303 may control the relief valve V8R to discharge hydraulic oil in the rod-side oil chamber of the arm cylinder 8 to the tank to release pressure. As a result, for example, when a reaction force (reaction moment) to lift up the back of the shovel 100 to tip the shovel 100 forward may act on the machine body (the upper swing structure 3) of the shovel 100 because of the movement of the attachment in the air, such as an earth dumping motion, the reaction force can be absorbed by the boom cylinder 7 or the arm cylinder 8. Therefore, the stabilization control part 303 can prevent the back of the shovel 100 from being lifted or prevent a lift of the back of the shovel 100 from increasing.

Likewise, when a lift of the front of the shovel 100 (the lower traveling structure 1) is likely to occur or when the lift has occurred because of the movement of the attachment or the lower traveling structure 1 responsive to the operator's operation, the stabilization control part 303 may control the relief valve V7R to discharge hydraulic oil in the rod-side oil chamber of the boom cylinder 7 to the tank to release pressure. Furthermore, when a lift of the front of the shovel 100 (the lower traveling structure 1) is likely to occur or when the lift has occurred because of the movement of the attachment or the lower traveling structure 1 responsive to the operator's operation, the stabilization control part 303 may control the relief valve V8B to discharge hydraulic oil in the bottom-side oil chamber of the arm cylinder 8 to the tank to release pressure. As a result, when a reaction force (reaction moment) to lift up the front of the shovel 100 to tip the shovel 100 backward may act on the machine body (the upper swing structure 3) because of the movement of the attachment, such as an excavating motion, the reaction force can be absorbed by the boom cylinder 7 or the arm cylinder 8. Therefore, the stabilization control part 303 can prevent the front of the shovel 100 from being lifted or prevent a lift of the front of the shovel 100 from increasing.

The stabilization control part 303 can, for example, calculate a tipping moment to tip the shovel 100 forward or backward based on the pose state of the attachment, the load state of the attachment or the lower traveling structure 1 due to the movement of the attachment or the lower traveling structure 1 (namely, the state of action of disturbance on the attachment or the machine body), etc., and determine the presence or absence of the possibility (sign) of a lift of the front or back of the shovel 100. In this case, the stabilization control part 303 can determine the pose state of the attachment based on the boom angle, the arm angle, and the end attachment angle detected by the boom pose sensor S1, the arm pose sensor S2, and the end attachment pose sensor S3, respectively. Furthermore, the stabilization control part 303 can determine the load state of the attachment based on the thrusts of the boom cylinder 7, the arm cylinder 8, the end attachment cylinder 9, etc., calculated from pressures detected by the boom bottom pressure sensor S7B, the boom rod pressure sensor S7R, the arm bottom pressure sensor S8B, the arm rod pressure sensor S8R, the end attachment bottom pressure sensor S9B, and the end attachment rod pressure sensor S9R. Furthermore, the stabilization control part 303 can detect the occurrence of a lift of the front or back of the shovel 100 (the lower traveling structure 1) based on the detection value of the machine body tilt sensor S4 or the swing state sensor S5, for example.

Furthermore, the stabilization control part 303 changes a control parameter associated with the stabilization control according to the weight, link length, or type of the end attachment 6 estimated by the end attachment estimating part 301. This is because a difference in the weight or link length of the end attachment 6 causes a change in the magnitude of a tipping moment that occurs because of the movement of the attachment caused by the operator's operation, so that even when the same control command is output to the relief valve V7B or V7R or the relief valve V8B or V8R, a response characteristic of the attachment (the boom cylinder 7 or the arm cylinder 8) may change to prevent a lift of the front or back of the shovel 100 from being appropriately controlled. In other words, the stabilization control part 303 corrects a response characteristic of the attachment to the operator's operation with respect to the stabilization control based on the weight, link length, or type of the end attachment 6 estimated by the end attachment estimating part 301. This enables the stabilization control part 303 to correct (adjust) a response characteristic of the attachment (the boom cylinder 7 or the arm cylinder 8) to more appropriately control instability phenomena such as a lift of the front or back of the shovel 100 and prevent an instability phenomenon that has occurred from being aggravated, even when the end attachment 6 is replaced.

Instead of correcting a response characteristic of the attachment (the boom cylinder 7 or the arm cylinder 8) to the operator's operation, the stabilization control part 303 may correct the operation details of the operator so that the same response characteristic is obtained. For example, when a lift of the back of the shovel 100 is likely to occur because of the movement of the lower traveling structure 1 or the attachment responsive to the operator's operation, or when the lift has occurred, the stabilization control part 303 may correct the details of an operation on the operating device 26 (lever device) such that the boom cylinder 7 moves to the bottom side, namely, the retraction side, or the arm cylinder 8 moves to the rod side, namely, the extension side. Furthermore, when a lift of the front of the shovel 100 is likely to occur because of the movement of the lower traveling structure 1 or the attachment responsive to the operator's operation, or when the lift has occurred, the stabilization control part 303 may correct the details of an operation on the operating device 26 (lever device) such that the boom cylinder 7 moves to the rod side, namely, the extension side, or the arm cylinder 8 moves to the bottom side, namely, the retraction side. In this case, the stabilization control part 303 may output a control command to the proportional valve 31 to cause a pilot pressure after correcting the details of the operator's operation to act on the control valve 17 via the shuttle valve 32.

[Configuration of Shovel Management System]

Next, a configuration of a shovel management system SYS is described with reference to FIG. 4.

Figure 4:
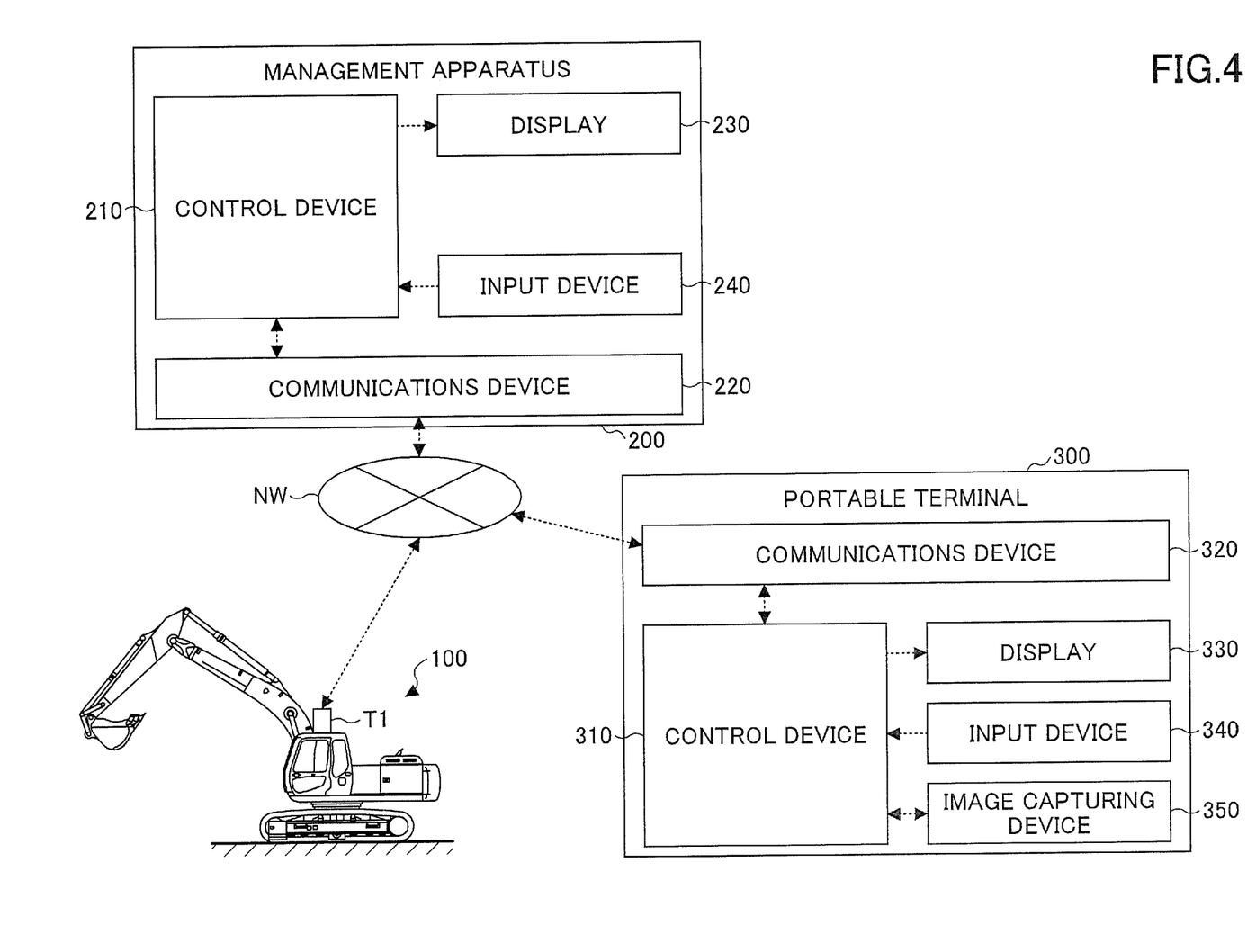
FIG. 4 is a block diagram illustrating an example configuration of a shovel management system.

As illustrated in FIG. 4, the shovel 100 may be a constituent element of the shovel management system SYS.

The shovel management system SYS includes the shovel 100, the management apparatus 200, and a portable terminal 300. The number of shovels 100 included in the shovel management system SYS may be one or more. The number of portable terminals 300 included in the shovel management system SYS may be one or more.

According to the shovel management system SYS, for example, the management apparatus 200 collects various kinds of information from the shovel 100 to monitor the operation status or the presence or absence of a failure of the shovel 100. Furthermore, according to the shovel management system SYS, for example, the management apparatus 200 delivers various kinds of information on the shovel 100 to the portable terminal 300.

<Configuration of Shovel>

As illustrated in FIG. 4, the shovel 100 includes a communications device T1 to be able to communicate with the management apparatus 200.

The communications device T1 communicates with an apparatus external to the shovel 100 (for example, the management apparatus 200) through a predetermined communication line NW. The communication line NW may include, for example, a mobile communication network including a base station as a terminal end. Furthermore, the communication line NW may also include, for example, a satellite communication network using a communications satellite. Furthermore, the communication line NW may also include, for example, the Internet. Furthermore, the communication line NW may also be, for example, a short-range communication network based on a standard such as Bluetooth (registered trademark) or Wi-Fi.

The communications device T1, for example, uploads (transmits) various kinds of information obtained at the shovel 100 to the management apparatus 200 under the control of the controller 30. Furthermore, the communications device T1, for example, receives information transmitted from the management apparatus 200 through the communication line NW. The information received by the communications device T1 is fed into the controller 30.

The configuration of the shovel 100 other than the communications device T1 may be represented by, for example, FIG. 2 or 3. Therefore, a description of the other configuration is omitted.

<Configuration of Management Apparatus>

The management apparatus 200 is placed outside the shovel 100. The management apparatus 200 is, for example, a server installed at a location different from a work site where the shovel 100 performs work. The server may be a cloud server or an edge server. Furthermore, the management apparatus 200 may also be a management terminal placed in a management office at a work site where the shovel 100 performs work.

The management apparatus 200 (an example of an information processing apparatus) includes a control device 210, a communications device 220, a display 230, and an input device 240.

The control device 210 executes various kinds of control related to the operation of the management apparatus 200. The functions of the control device 210 may be implemented by desired hardware or a combination of desired hardware and software. For example, the control device 210 is constituted mainly of a computer that includes a CPU, a memory unit such as a RAM, a secondary storage such as a ROM, and various input/output interface devices. Hereinafter, the same is true for a control device 310 of the portable terminal 300 described below.

The communications device 220 communicates with predetermined external apparatuses (for example, the shovel 100 and the portable terminal 300) through the communication line NW. The communications device 220, for example, transmits various kinds of information to the shovel 100 and the portable terminal 300 under the control of the control device 210. Furthermore, the communications device 220, for example, receives information transmitted (uploaded) from the shovel 100 and the portable terminal 300. The information received by the communications device 220 is fed into the control device 210.

The display 230 displays various kinds of information images to a manager, a worker, or the like at the management apparatus 200 (hereinafter "manager or the like") under the control of the control device 210. The display 230 is, for example, an organic EL (Electroluminescence) display or a liquid crystal display. Hereinafter, the same applies to a display 330 of the portable terminal 300 described below.

The input device 240 receives an operation input from the manager or the like at the management apparatus 200 and outputs the operation input to the control device 210. Examples of the input device 240 include desired hardware operation input devices such as a button, a toggle, a lever, a joystick, a keyboard, a mouse, and a touchscreen. The input device 240 may also include a virtual operation input part (for example, a button icon) displayed on the display 230 and operable through a hardware operation input device (for example, a touchscreen). The same is true for an input device 340 of the portable terminal 300 described below.

According to this example, the function of the end attachment estimating part 301 described above may be transferred to the control device 210 of the management apparatus 200.

The control device 210 may estimate the weight, size, or type of the end attachment 6 attached to the shovel 100 in the same manner as described above based on information uploaded from the shovel 100, for example.

Furthermore, the control device 210 may estimate the weight, size, or type of the end attachment 6 attached to the shovel 100 according to a predetermined request signal received from the portable terminal 300. The request signal includes image information including the end attachment 6 of the shovel 100 captured by a user of the portable terminal 300 using an image capturing device 350 of the portable terminal 300. This enables the control device 210 to estimate the weight, size, or type of the end attachment 6 attached to the shovel 100 in the same manner as in the case of using image information output from the image capturing device S6 of the shovel 100.

Furthermore, according to this example, the function of generating control parameters associated with the machine controlling control and the stabilization control may further be transferred to the control device 210 of the management apparatus 200.

The control device 210 generates control parameters associated with the machine controlling control and the stabilization control according to the estimated weight, size, or type of the end attachment 6, and transmits the control parameters to the shovel 100. In the case of estimating the type or the like of the end attachment attached to the shovel 100 based on a request signal received from the portable terminal 300, the control device 210 may transmit the generated control parameters to the shovel 100 that is recorded in correlation with the portable terminal 300 in advance. Furthermore, the control device 210 may also transmit the generated control parameters to the shovel 100 specified by a request signal received from the portable terminal 300 among multiple shovels 100 pre-recorded in the management apparatus 200. For example, a manager, the riding operator, or the like of the shovel 100 captures an image of the end attachment 6 of the shovel 100 with the image capturing device 350 and uploads image information to the management apparatus 200. This enables the manager, the riding operator, or the like of the shovel 100 to update control parameters of the shovel 100 according to the weight, size, or type of the end attachment 6.

<Configuration of Portable Terminal>

The portable terminal 300 is carried by an owner, a manager, or an operator of the shovel 100, a supervisor at a work site, or the like. Examples of the portable terminal 300 include a cellular phone, a smartphone, a tablet terminal, and a laptop computer terminal.

The portable terminal 300 includes the control device 310, a communications device 320, the display 330, the input device 340, and the image capturing device 350.

The control device 310 executes various kinds of control related to the operation of the portable terminal 300.

The communications device 320 communicates with a predetermined external apparatus (for example, the management apparatus 200) through the communication line NW. The communications device 320, for example, transmits various kinds of information to the management apparatus 200 under the control of the control device 310. Furthermore, the communications device 320, for example, receives information transmitted (downloaded) from the management apparatus 200. The information received by the communications device 320 is fed into the control device 310.

The display 330 displays various kinds of information images to a user of the portable terminal 300 under the control of the control device 310.

The input device 340 receives an operation input from a user of the portable terminal 300 and outputs the operation input to the control device 310.

The image capturing device 350 captures an image of the surroundings facing a lens installed on the back side or the like of the portable terminal 300 in response to a predetermined operation on the input device 340.

A user of the portable terminal 300 performs a predetermined operation on the input device 340 to start a predetermined application program (hereinafter "control parameter update request app") installed in the control device 310. Furthermore, the user of the portable terminal 300 causes the portable terminal 300 to obtain image information including the end attachment of the shovel 100, using the image capturing device 350, on a predetermined application screen corresponding to the control parameter update request app. The user of the portable terminal 300 then performs, through the input device 340, an operation for causing a request signal including the image information to be transmitted to the management apparatus 200 on the predetermined application screen corresponding to the control parameter update request app. In response to the operation, the control device 310 transmits a request signal including the image information showing the end attachment 6 of the shovel 100 to the management apparatus 200 through the communications device 320. As a result, in response to the request signal from the portable terminal 300, the management apparatus 200 estimates the end attachment 6 of the shovel 100 and transmits control parameters according to the estimated end attachment 6 to the shovel 100. Accordingly, the user of the portable terminal 300 can appropriately update the control parameters of the shovel 100 according to the weight, size, or type of the end attachment 6 by only operating the portable terminal 300.

The control parameters may be returned to the portable terminal 300. In this case, the user of the portable terminal 300 can manually update the control parameters at the shovel 100 while checking the details of the control parameters returned to the portable terminal 300.

Furthermore, the portable terminal 300 may also be configured to be able to directly communicate with the shovel 100 through the communications device 320. In this case, the above-described function of the end attachment estimating part 301 may be transferred to the control device 310 of the portable terminal 300 (an example of an information processing apparatus). Furthermore, in this case, the function of generating control parameters associated with the machine controlling control and the stabilization control may further be transferred to the control device 310 of the portable terminal 300.

[Operation]

According to this embodiment, the controller 30 (the end attachment estimating part 301) obtains information on the type, link length, or weight of the end attachment 6. Specifically, the controller 30 obtains information on the type, link length, or weight of the end attachment 6 based on image information output from the image capturing device S6. Furthermore, the controller 30 obtains information on the type, link length, or weight of the end attachment 6 based on a measured value of the end attachment cylinder 9. The controller 30 (the machine controlling control part 302 and the stabilization control part 303) corrects a response characteristic of the attachment or corrects the operation details of the attachment based on the obtained information.

Furthermore, according to this embodiment, the management apparatus 200 (or the portable terminal 300) obtains image information showing the end attachment 6 included in the attachment attached to the shovel 100. Furthermore, the management apparatus 200 (or the portable terminal 300) obtains information on the weight, link length, or type of the end attachment 6 based on the obtained image information. The management apparatus 200 (or the portable terminal 300) generates a control parameter associated with a response characteristic of the attachment or the operation details of the attachment based on the obtained information on the type or the like of the end attachment 6, and transmits the control parameter to the shovel 100.

This makes it possible to estimate the attached end attachment 6 more simply without using a distance sensor or the like to achieve an appropriate response characteristic to the operator's operation. That is, even when the end attachment 6 is replaced, it is possible to appropriately control the movement of the attachment according to (the link length or weight of) the end attachment 6 after the replacement.

The controller 30 may reflect information on the type, link length, or weight of the end attachment 6 in the movement control of the attachment other than the machine controlling control and the stabilization control. For example, when the end attachment 6 has been changed to a non-standard attachment, the controller 30 may change (correct) a response characteristic of the attachment to the operator's operation to adjust the response characteristic to a response characteristic of the attachment when a standard attachment serving as the end attachment 6 is attached to the distal end of the arm 5. Likewise, when the end attachment 6 has been changed to a non-standard attachment, the controller 30 may change (correct) the details of the operator's operation to adjust the details of the operator's operation to a response characteristic of the attachment when a standard attachment serving as the end attachment 6 is attached to the distal end of the arm 5. In this case, the controller 30 may output a control command to an undepicted pressure reducing valve installed in the pilot line 27B to cause a low pilot pressure relative to the operation details to act on the control valve 17 via the shuttle valve 32 or output a control command to the proportional valve 31 to cause a high pilot pressure relative to the operation details to act on the control valve 17 via the shuttle valve 32. This enables the operator to operate the attachment with the same operation feeling as in the case of a standard attachment even when the end attachment 6 is changed to a non-standard attachment.

Furthermore, according to this embodiment, the controller 30 (the machine controlling control part 302 or the stabilization control part 303) may change a control parameter in the machine controlling control to cause the attachment to automatically make a predetermined movement according to the operator's operation or the stabilization control to control the movement of the attachment to prevent a predetermined unstable state of the shovel 100 according to the operator's operation, based on the obtained information on the type, link length, or weight of the end attachment 6.

This makes it possible to appropriately implement the machine controlling control and the stabilization control according to the weight of the end attachment 6 after replacement even when the end attachment 6 is replaced.

Furthermore, according to this embodiment, the controller 30 (the end attachment estimating part 301) may determine the type of the end attachment 6 attached to the distal end of the arm 5 based on pre-recorded multiple types of end attachments (recorded end attachments) that serve as candidates for the end attachment 6.

This enables the controller 30 to determine (estimate) the type of the end attachment 6 from among multiple recorded end attachments serving as candidates for the end attachment 6. Therefore, the link length or weight of the end attachment 6 is specified (estimated) with more accuracy. Accordingly, even when the end attachment 6 is replaced, it is possible to more appropriately control the movement of the attachment according to the link length or weight of the end attachment 6 after the replacement.

Furthermore, according to this embodiment, the controller 30 (the end attachment estimating part 301) may obtain information on the type, link length, or weight of the end attachment 6 based on the pose state of the end attachment 6, and a predicted value of a cylinder thrust derived from the weight of a candidate end attachment serving as a standard (standard end attachment) and an actual measured value of the cylinder thrust derived from the pressure of the end attachment cylinder 9.

This enables the controller 30 to specifically obtain information on the type, link length, or weight of the end attachment.

Furthermore, according to this embodiment, the controller 30 (the end attachment estimating part 301) may obtain information on the type, link length, or weight of the end attachment in response to determining that the end attachment 6 is during aerial movement and is in an unloaded state (for example, a state where a bucket serving as the end attachment 6 is not loaded with earth or the like).

This makes it unnecessary for the controller 30 to consider a load on the end attachment 6. Therefore, it is possible to determine the type, link length, weight or the like of the end attachment 6 simply and accurately.

Furthermore, according to this embodiment, when the end attachment 6 is during aerial movement and a bucket serving as the end attachment 6 is loaded with earth or the like, the controller 30 (the end attachment estimating part 301) may obtain information on the type, link length, or weight of the end attachment 6 based on a comparison between the pose state of the bucket and the pose state (normal state) of the bucket that serves as a reference when the bucket is loaded with earth or the like.

This enables the controller 30 to determine the type, link length, weight or the like of the end attachment 6 even when a bucket serving as the end attachment 6 is loaded with earth or the like.

An embodiment of the present invention is described in detail above. The present invention, however, is not limited to the specifically disclosed embodiment, and variations and modifications may be made without departing from the scope of the present invention.

For example, according to the above-described embodiment, the shovel 100 is configured to hydraulically drive all moving elements such as the lower traveling structure 1, the upper swing structure 3, the boom 4, the arm 5, and the end attachment 6. The shovel 100, however, may also be configured to electrically drive one or more moving elements. That is, configurations, etc., disclosed in the above-described embodiment may be applied to hybrid shovels, electric shovels, etc.

What is claimed is:

1. A shovel comprising:
   a lower traveling structure;
   an upper swing structure swingably mounted on the lower traveling structure;
   a work attachment attached to the upper swing structure, the work attachment including a boom, an arm attached to a distal end of the boom, and an end attachment attached to a distal end of the arm;
   a first sensor configured to obtain data on a pose state of the work attachment; and
   a second sensor configured to obtain data on a pose state of the lower traveling structure or the upper swing structure,
   wherein predetermined control related to a movement of the work attachment is executed and information on a type of the end attachment is obtained, based on the data obtained by the first sensor and the second sensor, and
   a response characteristic of the work attachment or details of an operation for the work attachment during the predetermined control are corrected based on the obtained information on the type of the end attachment.

2. The shovel as claimed in claim 1, wherein
   the predetermined control is machine controlling control to cause the work attachment to automatically make a predetermined movement, or stabilization control to control the movement of the work attachment to prevent a predetermined unstable state of the shovel, and
   a control parameter in the machine controlling control or the stabilization control is changed based on the obtained information on the type of the end attachment.

3. The shovel as claimed in claim 2, wherein the machine controlling control controls the movement of the work attachment to move a predetermined part of the end attachment along a predetermined intended trajectory.

4. The shovel as claimed in claim 3, wherein
   the end attachment is a bucket,
   the predetermined part is teeth tips or a back surface of the bucket, and
   the machine controlling control controls the movement of the work attachment to move the teeth tips or the back surface of the bucket along a predetermined intended work surface.

5. The shovel as claimed in claim 1, further comprising:
   a camera configured to capture an image of the end attachment,
   wherein the information on the type of the end attachment is obtained based on image information output from the camera.

6. The shovel as claimed in claim 1, further comprising:
   a hydraulic cylinder configured to drive the work attachment,
   wherein the information on the type of the end attachment is obtained based a measured value of a pressure of the hydraulic cylinder.

7. The shovel as claimed in claim 6, wherein the information on the type of the end attachment is obtained based on a pose state of the end attachment and an actual measured value of a thrust of the hydraulic cylinder derived from the pressure of the hydraulic cylinder.

8. The shovel as claimed in claim 6, wherein the information on the type of the end attachment is obtained when it is determined that the end attachment is during aerial movement and is unloaded.

9. The shovel as claimed in claim 1, wherein the information on the type of the end attachment is obtained based on a comparison between a pose state of a bucket and a pose state of the bucket serving as a reference when the bucket is loaded with a predetermined target object, when the end attachment is during aerial movement and the bucket is loaded with the target object, the bucket serving as the end attachment.

10. The shovel as claimed in claim 1, wherein the type of the end attachment attached to the distal end of the arm is determined based on a plurality of types of end attachments that are candidates for the end attachment.

11. The shovel as claimed in claim 1, further comprising:
a communications device configured to communicate with a predetermined external apparatus,
wherein the work attachment is operated based on a signal related to remote control received from the predetermined external apparatus through the communications device.

12. A shovel comprising:
a lower traveling structure;
an upper swing structure swingably mounted on the lower traveling structure;
a work attachment attached to the upper swing structure, the work attachment including a boom, an arm attached to a distal end of the boom, and an end attachment attached to a distal end of the arm;
a first sensor configured to obtain data on a pose state of the work attachment; and
a second sensor configured to obtain data on a pose state of the lower traveling structure or the upper swing structure,
wherein predetermined control related to a movement of the work attachment is executed based on the data obtained by the first sensor and the second sensor,
information on a type of the end attachment is obtained, and a response characteristic of the work attachment or details of an operation for the work attachment during the predetermined control are corrected based on the obtained information on the type of the end attachment,
the predetermined control is machine controlling control to cause the work attachment to automatically make a predetermined movement, or stabilization control to control the movement of the work attachment to prevent a predetermined unstable state of the shovel,
a control parameter in the machine controlling control or the stabilization control is changed based on the obtained information on the type of the end attachment,
the predetermined unstable state is a state where a till of a front or a back of the lower traveling structure has occurred or is likely to occur, and
the stabilization control controls the movement of the work attachment to prevent the lift of the front or the back of the lower traveling structure from increasing or occurring.

13. The shovel as claimed in claim 12, further comprising:
a boom cylinder configured to drive the boom; and
an arm cylinder configured to drive the arm,
wherein the stabilization control discharges hydraulic oil in a predetermined oil chamber of the boom cylinder or the arm cylinder to a tank when the lift of the front or the back of the lower traveling structure has occurred or is likely to occur.

14. An information processing apparatus configured to obtain image information showing an end attachment included in a work attachment attached to a shovel, obtain information on a type of the end attachment based on the obtained image information, generate a control parameter associated with a response characteristic of the work attachment or details of an operation for the work attachment based on the obtained information on the type of the end attachment, and transmit the generated control parameter to the shovel.

15. The information processing apparatus as claimed in claim 14, comprising:
a communications device configured to communicate with a user terminal,
wherein the information on the type of the end attachment is obtained and the control parameter is generated and transmitted to the shovel, based on a request signal received from the user terminal through the communications device.

16. The information processing apparatus as claimed in claim 14, wherein
the information processing apparatus is a terminal device, and is configured to directly communicate with the shovel to transmit the generated control parameter to the shovel.

17. The information processing apparatus as claimed in claim 14, wherein the information processing apparatus is placed outside the shovel.

* * * * *